United States Patent Office 3,190,926
Patented June 22, 1965

3,190,926
HALOGENATED ORGANIC COMPOUNDS
Eric Descamp Edwards, London, England, assignor to Castrol Limited, London, England, a British company
No Drawing. Filed Nov. 17, 1960, Ser. No. 69,805
Claims priority, application Great Britain, Nov. 19, 1959, 39,327/59
4 Claims. (Cl. 260—613)

This invention relates to halogenated organic compounds and has particular reference to new halogenated polyethers and to methods of preparing such polyethers.

According to the present invention, there are provided halogenated polyethers having the general formula

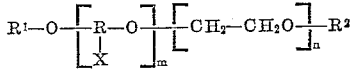

wherein R is a branched chain $C_3$ or $C_4$ alkylene radical, $R^1$ and $R^2$ are H, alkyl, cycloalkyl, aryl, aralkyl or alkaryl groups, X is chlorine or bromine, $m$ is an integer of at least 2 and $n$ is zero or an integer. Preferably $m$ is an integer from 2 to 70, while when $n$ is an integer, it is preferably not more than 50.

The degree of halogenation of these new compounds may vary over a wide range and it is to be understood that it is not essential for every repeating unit of the molecule, which is capable of being halogenated, to be halogenated. Also a repeating unit may be halogenated more than once. $R^1$ or $R^2$ may also contain halogen atoms.

The alkylene radical R is a branched chain propylene or butylene radical. It is believed that chlorination or bromination takes place primarily at the secondary carbon atoms of these branched chain alkylene groups. Preferably $R^1$ and $R^2$ are hydrogen or simple alkyl radicals.

Examples of the new compounds of this invention are obtained by chlorinating or brominating the materials known as "Ucon" fluids ("Ucon" is a registered trademark). These Ucon fluids are polyoxyalkylene glycol ethers and are either polyoxypropylene glycol ethers or ethers derived from mixtures of ethylene oxide and propylene oxide.

A particular example of compounds of this invention is

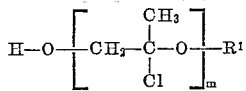

wherein $R^1$ is a short alkyl chain containing not more than 5 carbon atoms, e.g. methyl, ethyl or propyl, and m is about 7 to about 40.

The invention also includes a method of preparing a halogenated polyether which method comprises reacting chlorine or bromine with a polyether having the formula

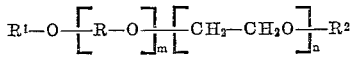

wherein R is a branched chain $C_3$ or $C_4$ alkylene radical, $R^1$ and $R^2$ are H, alkyl, cycloalkyl, aryl, aralkyl or alkaryl groups, $m$ is an integer of at least 2 and $n$ is zero or an integer. $R^1$ or $R^2$ may also be halogenated during the halogenation.

Preferably the reaction is carried out at a temperature between 60 and 100° C.

Examples of materials, which can be chlorinated or brominated to give the compounds of the present invention are:

Dipropylene glycol
Tripropylene glycol
Higher polypropylene glycols having molecular weights ranging from 250 to about 4000
Poly(1,3-butylene) glycols having molecular weights ranging from about 500 to about 2000
Monomethyl ether of polypropylene glycol of M.W. about 600
Mono-octyl ether of polypropylene glycol of M.W. about 600.
Monophenyl ether of polypropylene glycol of M.W. about 1000.

In the foregoing examples, it is to be understood that the various polypropylene glycols referred to are polymers of 1,3-propylene glycol. A range of suitable polypropylene glycols is available from the Dow Chemical Company under designations such as "Polyglycol P-250" the number referring to the average molecular weight. Specific examples of available products have average molecular weights of 250, 400, 750, 1200, 2000, 3000 and 4000. Poly(1,3-butylene) glycols are available from the same source, having average molecular weights of 5000, 1000, 1500 and 2000. Also available from this source are certain ethers such as those listed above and certain polyethers containing both polyoxypropylene and polyoxyethylene groupings, specific examples with reference to the general formula previously quoted being:

(1) Where $R^1$ is di-tertiary butyl phenyl; R is propylene; $R^2$ is H; $m$ is 4; and $n$ is 10. This polyether is sold under the trade name "Polyglycol 58–1."

(2) Where $R^1$ is biphenylyl; R is propylene; $R^2$ is H; $m$ is 5 and $n$ is 5. This polyether is sold under the trade name "Polyglycol 28–1."

As already indicated, other examples of compounds which may be chlorinated or brominated to yield new and useful products in accordance with the present invention are the "Ucon" fluids marketed by Union Carbide Chemicals Company. Thus the "LB" series of "Ucon" lubricants is understood to consist of polyoxypropylene glycol mono-ethers, products being available in a range of viscosities corresponding to molecular weights of the order of about 400 to about 2,500 to 3,000 e.g. about 2,800.

Also available are the "DLB" series which are polyoxypropylene glycol diethers. Two other series of "Ucon" lubricants are available, the "50–HB" and "75–H" series, these being polyoxyethylene/polyoxypropylene glycols or mono-ethers thereof and being soluble in water, whereas the "LB" and "DLB" series are insoluble in water.

Chlorinated polyglycols and polyglycol ethers of the present invention may conveniently be prepared by passing chlorine gas through the polyglycol or polyglycol ether, in the presence of, if desired, a small quantity of phosphorous trichloride as a promotor for the reaction, until the desired increase in weight is obtained. Satisfactory chlorinations have been carried out in the absence of a promotor. The corresponding brominated compounds may be prepared by the gradual addition of bromine to polyglycols or polyglycol ethers at 50 to 60° C. in the presence of the same or a similar promotor, the mixture being heated and stirred until the reaction is complete. Halogenation promotors are well-known to those skilled in the art; a similar promotor to phosphorous trichloride is phosphorous tribromide. An example of another halogenation promotor is iodine.

As already indicated, it is believed that the principal reaction involves the substitution by chlorine or bromine of the hydrogen on the secondary carbon atom.

The invention also includes a lubricating composition comprising a lubricating oil having dissolved therein a halogenated polyether in accordance with the invention, the halogenated polyether being soluble in the said oil and present in an amount to provide from 0.05 to 1.5% by weight on the weight of the composition of chlorine or bromine. The amount of chlorine or bromine present in the composition is preferably from 0.1 to 0.5% by weight on the weight of the composition. The lubricating oil may be a mineral lubricating oil, an ester-based lubricant, or a polyalkylene glycol ether or polyalkylene ether e.g. of the type from which a halogenated polyether may be made.

Following is a description by way of example of methods of preparing new compounds of this invention.

EXAMPLE I

Ucon LB-1145 (100 grams) was placed in a 250 ml. round-bottomed flask and three drops of phosphorous trichloride were added as a carrier.

A steady stream of chlorine was introduced from a cylinder by means of a sintered glass bubbler for 2½ hours, during which time HCl was freely evolved. The reaction was exothermic and the temperature of the reaction mixture reached 95° C. after 15 minutes and then fell to 90° C. during a further 15 minutes. It was thereafter maintained at 90° C. using a water-bath.

At the conclusion of the chlorination, nitrogen was bubbled through the liquid to remove excess chlorine and free HCl.

The chlorinated Ucon resulting from this method showed an increase in weight of 25%. The product was a viscous dark brown liquid which contained 20.7% of chlorine.

EXAMPLE II

The procedure of Example I was repeated using Ucon fluid LB-285 and instead of using nitrogen to remove excess chlorine and the resulting free HCl, the product was dissolved in benzene and washed with 5% aqueous sodium bicarbonate until $CO_2$ was no longer evolved. The benzene solution was then dried over anhydrous magnesium sulphate. The dried benzene solution was distilled to remove benzene, yielding a viscous amber liquid which contained 27.7% chlorine.

EXAMPLE III

Dipropylene glycol (300 g.) was weighted into a 1 litre three-necked creased flask and three drops of phosphorous trichloride added.

The flask was heated in an oil bath to 65° C. and chlorine was bubbled through, the bath temperature being kept constant. When evolution of HCl had ceased (after about 8 hours), the product was dissolved in benzene, washed three times with aqueous sodium bicarbonate and once with water, dried over anhydrous magnesium sulphate and freed from solvent by distillation.

The product was a pale yellow viscous liquid containing 24.6% of chlorine.

EXAMPLE IV

"Polyglycol B-1000," a poly(1,3-butylene) glycol of M.W. about 1000 (300 g.) was chlorinated by the procedure outlined in Example III, the bath being maintained at 60° C. for 8 hours.

During this period an increase in weight of 105 g. (35%) was obtained, which did not increase during a further 30 minutes.

After purification in the manner described in Example III, the product was obtained as a yellow, fairly mobile liquid containing 21.8% Cl.

EXAMPLE V

Ucon LB-285 (53 g.) was weighed into a 500 ml. three-necked rounded-bottomed flask, fitted with a dropping funnel, water condenser and mechanical stirrer.

The flask was heated on an oil bath to 50° C. and bromine (160 g.) was run in gradually from the tap funnel over a period of 2 hours, the liquid being efficiently stirred the while.

A slightly exothermic reaction took place, with evolution of HBr. The mixture was then stirred at 55° C. for a further three hours and then at 65° C. for five hours, after which evolution of HBr had virtually ceased.

The product was then dissolved in benzene, washed three times with 5% aqueous sodium bicarbonate, twice with water, dried over anhydrous magnesium sulphate and freed from solvent by heating on a water-bath under vacuum. It was thus obtained as a light amber liquid containing 57.8% bromine.

By methods essentially similar to those described in Examples I to V, a number of chlorinated and brominated polyglycols and polyglycol ethers were prepared. A summary of some of these compounds is given in Table I which includes data on the products already described.

*Table I*

| Product of— | Prepared from— | Percent Cl | | Percent Br | |
|---|---|---|---|---|---|
| | | Found | Calculated | Found | Calculated |
| Example I | Ucon LB-1145 | 20.7 | 38 | | |
| Example II | Ucon LB-285 | 27.7 | 37-38 | | |
| Example III | Dipropylene glycol | 24.6 | 35 | | |
| Example IV | Polyglycol B-1000 | 21.8 | 33 | | |
| Example V | Ucon LB-285 | | | 57.8 | 53 |
| Product VI | Ucon 50-HB-3520 | 10.5 | | | |
| Product VII | Ucon 75-H-1400 | 9.8 | | | |
| Product VIII | Ucon DLB-144 | 20.1 | 35-37 | | |
| Product IX | Polypropylene glycol (M.W. about 400). | 18.5 | 37 | | |
| Product X | Polypropylene glycol (M.W. 175). | | | 28.8 | 56 |

In the foregoing table the calculated values for chlorine and bromine content were approximate only and were obtained by assuming the complete replacement of all the hydrogen atoms attached to secondary carbon atoms by halogen with no halogenation of any other part of the molecule. In order to obtain these calculated values, it was necessary to know the molecular weight of the starting material. Where this was not already known, it was calculated from the hydroxyl value. It was not possible to make calculations in the case of Ucon 50-HB-3520 and Ucon 75-H-1400 since the molar ratios of ethylene oxide units to propylene oxide units were not known. The chlorine contents of the products from these two Ucons were substantially lower than those of the other substances prepared, this being presumably due to the fact that only the propylene oxide units were chlorinated to any appreciable extent.

The fact that in the majority of instances the chlorine contents of the products were appreciably below the calculated values was believed to be due to the highly reactive nature of the chlorine in these compounds. Some of this chlorine was probably removed by hydrolysis during the washing with aqueous bicarbonate whilst there was a tendency for some to be eliminated as HCl during the final stripping of the solvent. Some at least of these compounds hydrolyse in moist air.

The results of tests carried out by this method are summarised in Table III.

*Table III*

FOUR BALL MACHINE TESTS

| Test No. | Lubricating oil base | Additive | Load, kg. at incipient seizure | Weld pt. (kg.) | Approx. load (kg.) at which wear scar diameter (mm.) | | |
|---|---|---|---|---|---|---|---|
| | | | | | 1.5 | 2.0 | 2.5 |
| 1 | Mineral oil A | None | 65/70 | 140/150 | 69 | 70 | 90 |
| 2 | ----do---- | Product X (1.0%) | 100/105 | 310 | 120 | 200 | 290 |
| 3 | ----do---- | Product of Example IV (2.0%) | 100/105 | 370 | 250 | 300 | 360 |
| 4 | Dinonyl sebacate | None | 55/60 | 120 | 59 | 75 | 110 |
| 5 | ----do---- | Product similar to Example I but containing 27.0% Cl (0.5%) | 90/95 | 140 | 95 | 110 | 130 |

Thus, in one experiment Ucon LB–1145 was chlorinated at 85 to 90° C. to yield a product containing 31% Cl prior to washing. After the usual washing procedure the chlorine content had fallen to 28% and after refluxing the product in toluene for 8 hours it fell further to about 26%, some HCl having been evolved during the refluxing process.

It will be appreciated therefore that the compositions of the present invention may include compounds in which minor proportions of the chlorine have been replaced by hydroxyl radicals or hydrogen chloride has been split off to provide ethylenic linkages.

The new compounds described herein are useful as intermediates in the synthesis of lubricating oil additives and of organic chemicals generally. They are also, in certain instances, useful as additives for lubricating oils or cutting oils to impart extreme pressure properties.

The solubilities of specific examples of the compounds of the present invention in a mineral lubricating oil, a typical synthetic diester lubricant and a typical polyglycol ether synthetic lubricant are listed in Table II.

*Table II*

| | Solubility in | | |
|---|---|---|---|
| | Mineral lubricating oil | Di(2-ethyl hexyl) sebacate | Ucon LB1145 |
| Product of Example I | Insoluble | Soluble | Soluble. |
| Product of Example III | ----do---- | ----do---- | Do. |
| Product of Example IV | Soluble | ----do---- | Do. |
| Product of Example V | Insoluble | ----do---- | Do. |
| Product VI | ----do---- | Insoluble | Very slightly soluble. |
| Product VII | ----do---- | ----do---- | Insoluble. |
| Product VIII | ----do---- | Soluble | Soluble. |
| Product IX | ----do---- | ----do---- | Do. |
| Product X | Soluble | ----do---- | Do. |

The product of Example III and Product VII were both freely soluble in water whilst that of Product VI was dispersible in water giving a cloudy emulsion. These materials might therefore be useful as addition agents to water-based lubricants.

To demonstrate the usefulness of compounds in accordance with the present invention as extreme pressure additives for lubricants, tests were carried out on the well-known Four-ball Machine similar to that described by Boerlage in "Engineering," July 13, 1933, volume 136, page 46. This apparatus comprised four steel balls arranged in the form of a pyramid. The top ball was held in a chuck attached to a spindle rotating at approximately 1500 rev./min. and pressed against the three bottom balls clamped in a stationary ball-holder. The balls were immersed in the oil to be tested. Tests were normally run for one minute at a series of different loads.

The excellent extreme pressure properties of the compounds tested are amply demonstrated by the foregoing results.

The new compounds described in these examples are useful as intermediates in the synthesis of lubricating oil additives and of organic chemicals generally.

I claim:

1. A halogenated polyether containing from about 10% to about 58% by weight of a halogen selected from the group consisting of chlorine and bromine prepared by reacting a polyether of the formula

wherein R is selected from the group consisting of branched chain $C_3$ and $C_4$ alkylene radicals; $R^1$ and $R^2$ are selected from the group consisting of hydrogen, alkyl containing not more than 8 carbon atoms, phenyl, biphenyl and di-tertiary butyl phenyl; $m$ is an integer of from 2 to 70 and $n$ is not more than 50 at a temperature from about 50° C. to 100° C. with a halogen selected from the group consisting of chlorine and bromine until the product contains at least about 10% by weight of said halogen.

2. A halogenated polyether as claimed in claim 1 in which $R^1$ is hydrogen, $R^2$ is alkyl containing not more than 5 carbon atoms, $n$ is zero and $m$ is an integer between 7 and 40.

3. A halogenated polyether as claimed in claim 1 wherein the halogen is added gradually to the polyether.

4. A halogenated polyether as claimed in claim 3 in which the halogen is added to the polyether in the presence of phosphorous trichloride.

References Cited by the Examiner

UNITED STATES PATENTS

| 2,327,053 | 8/43 | Marple et al. | 260—615 |
|---|---|---|---|
| 2,522,155 | 9/50 | Ballard et al. | 260—615 |
| 2,536,685 | 1/51 | Harman et al. | 260—615 X |
| 2,620,309 | 12/52 | Stewart et al. | 252—54 |
| 2,723,999 | 11/55 | Cowen et al. | 260—615 |
| 2,814,595 | 11/57 | Beerbower et al. | 252—54 |
| 2,965,678 | 12/60 | Sundberg et al. | 260—615 |
| 2,989,547 | 6/61 | Whyte | 260—615 X |

FOREIGN PATENTS

| 528,136 | 7/56 | Canada. |
|---|---|---|
| 802,778 | 10/58 | Great Britain. |

OTHER REFERENCES

Curme et al.: Glycols (1952), page 328.
Gilman et al.: Organic Synthesis, Collective Vol. I (2nd ed.) (1951), pp. 115–116.

LEON ZITVER, *Primary Examiner.*

JULIUS GREENWALD, *Examiner.*